(12) United States Patent
Miller et al.

(10) Patent No.: US 11,296,649 B2
(45) Date of Patent: Apr. 5, 2022

(54) FOLDABLE SOLAR PANEL ASSEMBLY

(71) Applicant: National Oilwell Varco, L.P., Houston, TX (US)

(72) Inventors: Travis James Miller, Cypress, TX (US); Farzad Azizi, Sugarland, TX (US); Julio C Garza, Houston, TX (US)

(73) Assignee: NATIONAL OILWELL VARCO, L.P.

( * ) Notice: Subject to any disclaimer, the term of this patent is extended or adjusted under 35 U.S.C. 154(b) by 0 days.

(21) Appl. No.: 17/169,659

(22) Filed: Feb. 8, 2021

(65) Prior Publication Data

US 2021/0249991 A1 Aug. 12, 2021

Related U.S. Application Data

(60) Provisional application No. 62/971,665, filed on Feb. 7, 2020.

(51) Int. Cl.
*H02S 30/20* (2014.01)
*H02S 30/10* (2014.01)

(52) U.S. Cl.
CPC .............. *H02S 30/20* (2014.12); *H02S 30/10* (2014.12)

(58) Field of Classification Search
CPC ................................ H02S 30/20; H02S 30/10
See application file for complete search history.

(56) References Cited

U.S. PATENT DOCUMENTS

| | | |
|---|---|---|
| 9,708,139 B2 | 7/2017 | Kamata |
| 10,801,755 B1 | 10/2020 | Nemat et al. |
| 10,931,224 B2 | 2/2021 | Praca et al. |
| 2008/0308091 A1 | 12/2008 | Corio |
| 2012/0027550 A1 | 2/2012 | Bellacio et al. |
| 2012/0073565 A1 | 3/2012 | Grant et al. |
| 2012/0279069 A1 | 11/2012 | Von Deylen |
| 2013/0037081 A1 | 2/2013 | Grant |
| 2013/0269752 A1 | 10/2013 | Corio |
| 2013/0276862 A1 | 10/2013 | Luo |
| 2013/0340807 A1* | 12/2013 | Gerwing ................. H01L 31/02 136/246 |
| 2014/0203233 A1 | 7/2014 | Larsen |
| 2014/0216522 A1 | 8/2014 | Au |
| 2014/0360552 A1 | 12/2014 | Britcher et al. |
| 2015/0000721 A1 | 1/2015 | Au |
| 2015/0000722 A1 | 1/2015 | Au |
| 2015/0092383 A1 | 4/2015 | Corio et al. |

(Continued)

FOREIGN PATENT DOCUMENTS

| | | |
|---|---|---|
| KR | 101227088 B1 | 1/2013 |
| KR | 20140126804 A | 11/2014 |

(Continued)

*Primary Examiner* — Jayne L Mershon
(74) *Attorney, Agent, or Firm* — Jonathan Pierce; Pierre Campanac; Porter Hedges LLP

(57) ABSTRACT

Several pre-assemblies holding panels of photovoltaic cells are constructed and pre-wired in a factory. The pre-assemblies are shipped to a solar farm, where they are lifted above posts secured to the ground. By being foldable, the solar panel assemblies can provide a compact shipping arrangement. Operators can connect the solar panel assemblies to a support and then unfolded the solar panel assemblies and lock them in the unfolded position.

24 Claims, 8 Drawing Sheets

(56) References Cited

U.S. PATENT DOCUMENTS

| | | | |
|---|---|---|---|
| 2015/0207452 A1 | 7/2015 | Werner et al. | |
| 2015/0377520 A1 | 12/2015 | Kufner | |
| 2016/0190976 A1 | 6/2016 | Corio et al. | |
| 2017/0237391 A1 | 8/2017 | Michotte De Welle | |
| 2017/0336105 A1 | 11/2017 | Au | |
| 2019/0158017 A1 | 5/2019 | Hu | |
| 2019/0199276 A1 | 6/2019 | Bailey et al. | |
| 2020/0036325 A1 | 1/2020 | Poivet | |
| 2020/0076360 A1* | 3/2020 | Watson | F24S 25/636 |
| 2020/0412295 A1 | 12/2020 | Miller et al. | |

FOREIGN PATENT DOCUMENTS

| | | |
|---|---|---|
| KR | 20160000769 U | 3/2016 |
| KR | 20190111185 A | 10/2019 |

* cited by examiner

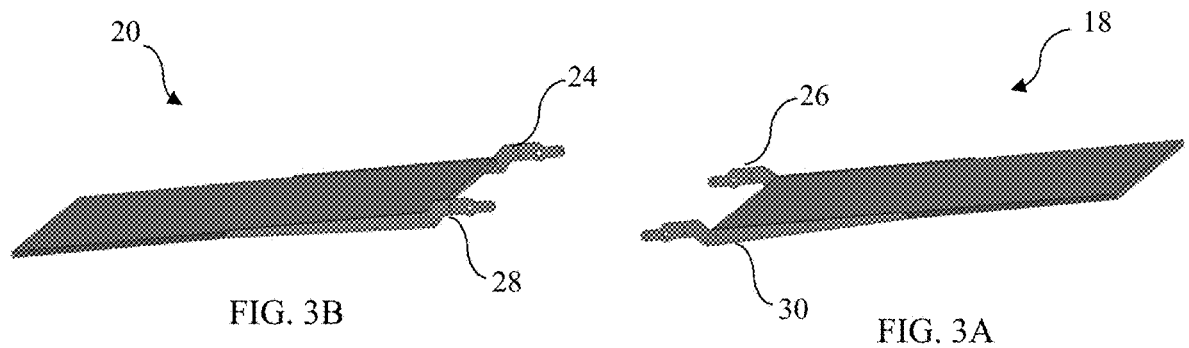
FIG. 3B
FIG. 3A
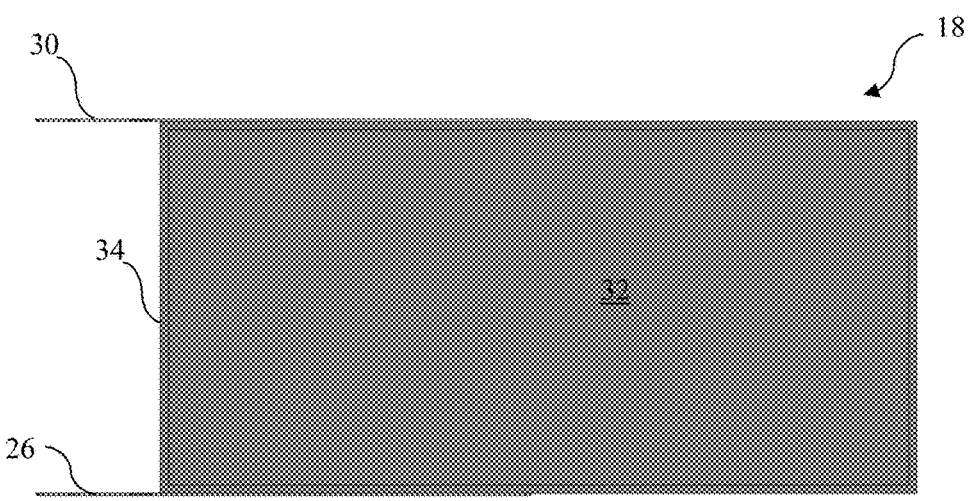
FIG. 4
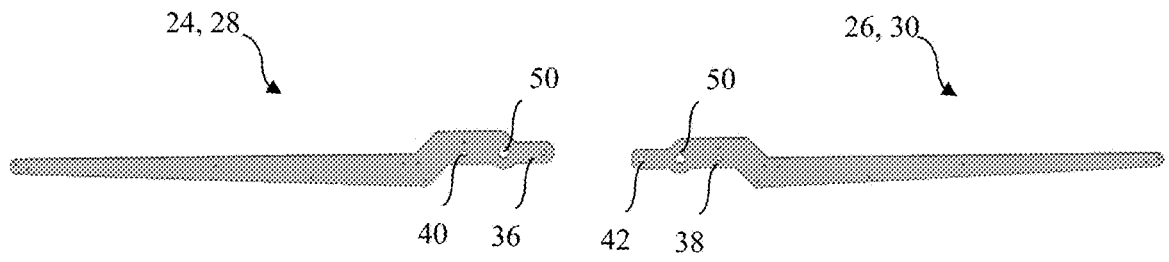
FIG. 5A
FIG. 5B

FOLDABLE SOLAR PANEL ASSEMBLY

CROSS-REFERENCE TO RELATED APPLICATIONS

This application claims the benefit of filing priority to U.S. provisional application Ser. No. 62/971,665 filed on Feb. 7, 2020. The priority application Ser. No. 62/971,665 is incorporated herein by reference for any and all purposes.

BACKGROUND

This disclosure relates generally to foldable solar panel assemblies that can be easily pre-assembled and transported to a solar farm site where they can be installed.

Utility companies utilize solar farms to generate electricity and distribute it on the grid. A typical solar farm generates electrical power on the order of several hundreds of megawatts. The installation of solar panels in a solar farm is labor-intensive. There have been attempts to reduce manual labor required for solar panel installations. For example, robots that use fixed axis systems and dedicated mounting structures have been proposed. These robots require significant precision and are expensive.

Thus, there is a continuing need in the art for foldable solar panel assemblies that can be easily pre-assembled and transported to a solar farm site where they can be installed.

BRIEF SUMMARY OF THE DISCLOSURE

The disclosure describes a solar panel assembly for connection to a support.

The solar panel assembly may comprise an elongated beam. The elongated beam may have a longitudinal axis.

The solar panel assembly may comprise a shaft portion. The shaft portion may be coupled to the elongated beam. For example, the shaft portion may be coupled to the elongated beam by a revolute joint. The shaft portion may have a central axis parallel to the longitudinal axis of the elongated beam.

The solar panel assembly may comprise a first frame. The first frame may hold a first panel of photovoltaic cells.

The solar panel assembly may comprise a first drive link. The first drive link may have a first end rotatably coupled to the shaft portion and a second end coupled to the first frame. The first drive link may include a first surface offset from the shaft portion. For example, the first surface may be located in a first aperture of the first drive link or on a first flange of the first drive link. Optionally, the first drive link may further include another aperture offset from the shaft portion in a direction toward the second end of the first drive link. Alternatively or additionally, the first drive link may include a first hollow. The first hollow may be moved to a position that is offset from the shaft portion in a direction substantially perpendicular to the first frame.

In some embodiments, the first drive link may comprise a first drive plate. The first drive plate may extend laterally along a first plane substantially perpendicular to the central axis of the shaft portion. The first drive plate may be disposed beyond a periphery of the first frame. The first drive plate may have a lateral size that is larger than a thickness of the first frame. The first drive link may further comprise another drive plate. The other drive plate may be coupled to the first drive plate via a first revolute joint such that the other drive plate can be unfolded along the first plane.

The solar panel assembly may comprise a second frame. The second frame may hold a second panel of photovoltaic cells.

The solar panel assembly may comprise a second drive link. The second drive link may have a first end rotatably coupled to the shaft portion and a second end coupled to the first frame. The second drive link may include a second surface offset from the shaft portion. For example, the second surface is located in a second aperture of the second drive link or on a second flange of the second drive link. Optionally, the second drive link further includes another aperture offset from the shaft portion in a direction away from the second end of the second drive link. Alternatively, or additionally, the second drive link may include a second hollow. The second hollow may be moved to a position that is offset from the shaft portion in a direction substantially perpendicular to the second frame.

In some embodiments, the second drive link may comprise a second drive plate. The second drive plate may extend laterally along a second plane substantially perpendicular to the central axis of the shaft portion. The second drive plate may be disposed beyond a periphery of the second frame. The second drive plate may have a lateral size that is larger than a thickness of the second frame. The second drive link may further comprise another drive plate. The other drive plate may be coupled to the second drive plate via a second revolute joint such that the other drive plate can be unfolded along the second plane.

The solar panel assembly may further comprise a transfer key. The transfer key may be coupled to the shaft portion. For example, the transfer key may be coupled to the shaft portion by a prismatic joint. The transfer key may be shaped to be coupled to the first drive link and to the second drive link. For example, the transfer key may include two apertures. The first aperture and one of these two apertures can be disposed proximate one another. The second aperture and the other of these two apertures can be disposed proximate one another when the first aperture and the one of these two apertures are disposed proximate one another. In some embodiments, the transfer key may comprise a transfer plate. The transfer plate may be coupled to the shaft portion. The transfer plate may extend laterally along a third plane substantially perpendicular to the central axis of the shaft portion. The transfer plate may be sized to have a first end coupled to the first drive plate and a second end coupled to the second drive plate. The transfer plate may be coupled to the shaft portion by a prismatic joint.

The first drive link may be capable of rotating around the central axis of the shaft portion relative to the second drive link such that the first panel and the second panel can be folded and unfolded.

The first drive link and the second drive link may be shaped to be coupled to each other when unfolded such that the first panel and the second panel do not rotate relative to each other. For example, the first surface and the second surface can be disposed proximate one another such that a first fastener can be engaged with the first surface and the second surface. In some embodiments where the first surface is located on the first flange of the first drive link, and the second surface is located on a second flange of the second drive link, the first fastener may comprise a collar clamp. In some embodiments where the first drive link includes more than one aperture and the second drive link includes more than one aperture, the additional apertures can be disposed proximate one another when the first aperture and the second aperture are disposed proximate one another such that additional fastener can be engaged with additional apertures.

Optionally, the first hollow and the second hollow may be disposed proximate one another such that the elongated beam can pass through a hole formed by the first hollow and the second hollow.

The disclosure describes a method for deploying a solar panel assembly on a site.

The method may comprise the step of transporting a solar panel assembly to the site, wherein the solar panel assembly is described hereinabove.

The method may comprise the step of connecting the elongated beam of the solar panel assembly to a support.

The method may comprise the step of rotating the first drive link around the central axis of the shaft portion relative to the second drive link such that the first panel and the second panel become unfolded.

The method may comprise the step of coupling the first drive link and the second drive link to each other when unfolded, such that the first panel and the second panel do not rotate relative to each other. For example, the method may comprise the steps of disposing the first surface and the second surface proximate one another, and engaging the first fastener with the first surface and the second surface such that the first drive link and the second drive link are coupled to each other.

The method may comprise the step of coupling the transfer key to the first drive link and to the second drive link.

The method may comprise the step of unfolding drive plates.

The method may comprise the step of disposing the first hollow and the second hollow proximate one another such that the elongated beam passes through the hole formed by the first hollow and the second hollow.

The disclosure describes a solar panel.

The solar panel may comprise a solar panel assembly. The solar panel assembly may include an elongated beam, at least two shaft portions, a first frame, a first pair of drive plates, a second frame, and a second pair of drive plates.

The elongated beam may have a longitudinal axis. Each of the shaft portions may be coupled to the elongated beam. Each of the shaft portions may have a central axis parallel to the longitudinal axis of the elongated beam. Optionally, the at least two shaft portions may be part of a single shaft spanning substantially the entire length of the elongated beam.

The first frame may hold a first panel of photovoltaic cells. One of the first pair of drive plates may extend laterally along a plane substantially perpendicular to the central axis of one of the at least two shaft portions. The other of the first pair of drive plates may also extend laterally along a plane substantially perpendicular to the central axis of the other of the at least two shaft portions. Each of the first pair of drive plates may be disposed beyond a periphery of the first frame. The first pair of drive plates may be coupled on opposite sides of the first frame. Each of the first pair of drive plates may have a lateral size that is larger than a thickness of the first frame. 25. Optionally, each of the first pair of drive plates may be coupled to another drive plate via a revolute joint such that the other drive plate can be unfolded along a plane substantially perpendicular to the central axis of one of the at least two shaft portions.

The second frame may hold a panel of photovoltaic cells. One of the second pair of drive plates may extend laterally along a plane substantially perpendicular to the central axis of one of the at least two shaft portions. The other of the second pair of drive plates may extend laterally along a plane substantially perpendicular to the central axis of the other of the at least two shaft portions. Each of the second pair of drive plates may be disposed beyond a periphery of the second frame. The second pair of drive plates may be coupled on opposite sides of the second frame. Each of the second pair of drive plates may have a lateral size that is larger than a thickness of the second frame. Optionally, each of the second pair of drive plates may be coupled to another drive plate via a revolute joint such that the other drive plate can be unfolded along a plane substantially perpendicular to the central axis of one of the at least two shaft portions.

One of the first pair of drive plates and one of the second pair of drive plates may be coupled to each other such that the first panel and the second panel do not rotate relative to each other. The other of the first pair of drive plates and the other of the second pair of drive plates may also be coupled to each other such that the first panel and the second panel do not rotate relative to each other.

The solar panel may comprise a first post secured into a support.

The solar panel may comprise a first mounting bracket. The first mounting bracket may connect the elongated beam to the first post.

The solar panel may comprise a second post secured into the support.

The solar panel may comprise a second mounting bracket. The second mounting bracket may connect the elongated beam to the second post.

The solar panel may comprise a first rotating bearing. The first rotating bearing may connect the first mounting bracket to the elongated beam.

The solar panel may comprise a second rotating bearing. The first rotating bearing may connect the second mounting bracket to the elongated beam.

BRIEF DESCRIPTION OF THE DRAWINGS

For a description of the embodiments of the disclosure, reference will now be made to the accompanying drawings, wherein:

FIGS. 3A and 3B are perspective views of a frame holding a panel of photovoltaic cells, the frame being coupled to a pair of drive plates;

FIG. 4 is a bottom view of the frame, the panel of photovoltaic cells, and the pair of drive plates shown in FIG. 3A;

FIGS. 5A and 5B are side views of a drive plate;

DETAILED DESCRIPTION

Figure 1:
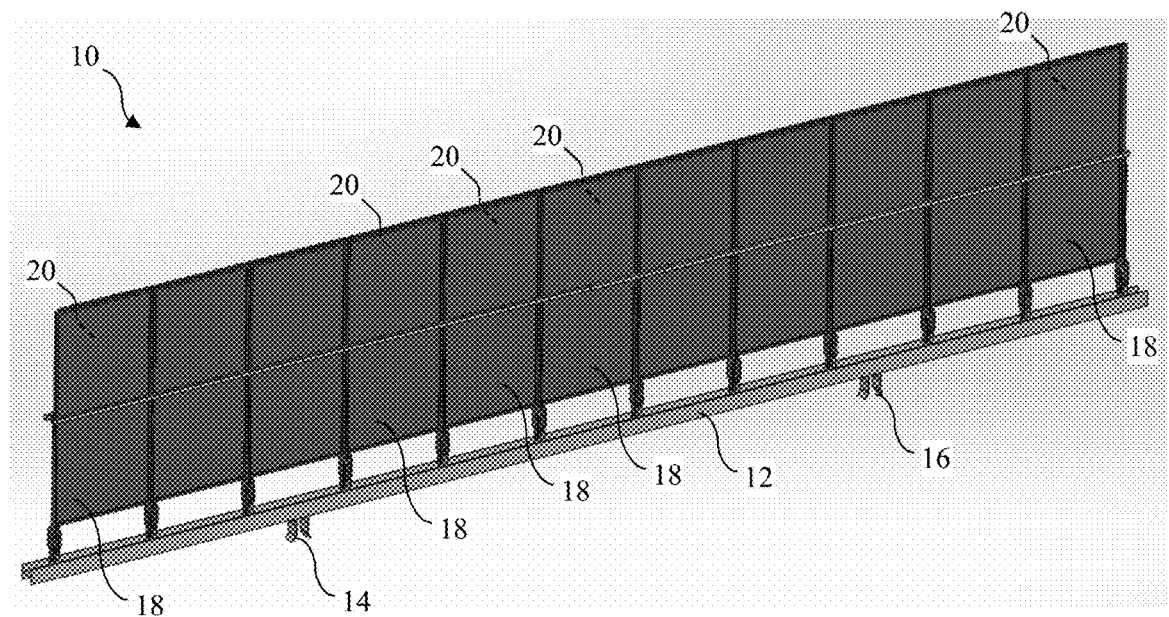
FIG. 1 is a perspective view of a foldable panel assembly illustrated in the folded position.

It is to be understood that the following disclosure describes several exemplary embodiments for implementing different features, structures, or functions of the invention. Exemplary embodiments of components, arrangements, and configurations are described below to simplify the disclosure; however, these exemplary embodiments are provided merely as examples and are not intended to limit the scope of the invention. Additionally, the disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Finally, the exemplary embodiments presented below may be combined in any combination of ways, i.e., any element from one exemplary embodiment may be used in any other exemplary embodiment, without departing from the scope of the disclosure.

All numerical values in this disclosure may be approximate values unless otherwise specifically stated. Accordingly, various embodiments of the disclosure may deviate from the numbers, values, and ranges disclosed herein without departing from the intended scope. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

The disclosure describes a cost-effective way of manufacturing, shipping, installing, and operating solar panels. The solar panel assemblies are designed to withstand the environmental loadings and have improved reliability.

Solar panel assemblies can be pre-assembled, for example, in a factory. By being foldable, the solar panel assemblies can provide a compact shipping arrangement. After being pre-assembled, the solar panel assemblies can be shipped either with a transport truck or inside a shipping container.

The solar panel assemblies can be installed on a site using heavy-duty lifting equipment fitted with a lifting jig. Operators can connect the solar panel assemblies to a support, which may be tilted for accounting for the average declination of the sun path, and then unfold the solar panel assemblies and lock them in the unfolded position. After being locked, the solar panels assemblies can remain orientable to track the daily movement of the sun, or can remain fixed.

Referring to FIG. 1, a solar panel assembly 10 is illustrated in a folded position. Such a folded position may be convenient during transportation of the solar panel assembly 10 from a factory, where the solar panel assembly 10 may have been pre-assembled, to a deployment site, such as a solar farm.

Figure 2:
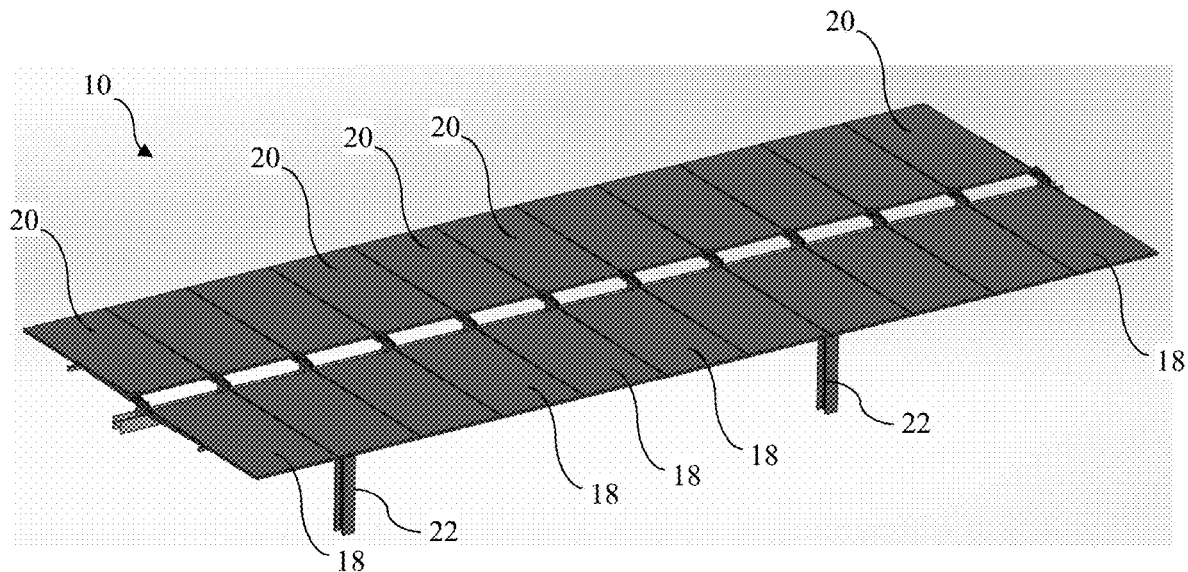
FIG. 2 is a perspective view of a solar panel including the foldable panel assembly shown in FIG. 1, the foldable panel assembly being unfolded and connected to a support.

The solar panel assembly 10 comprises an elongated beam 12, a first mounting bracket 14 for connecting the elongated beam 12 to the first post 22 (in FIG. 2), and a second mounting bracket 16 for connecting the elongated beam 12 to the second post 22 (in FIG. 2). The folded position illustrated in FIG. 1 may also be convenient during connection of the solar panel assembly 10 to the first and second posts 22 previously secured to a support (e.g., the ground) at the deployment site. The solar panel assembly 10 can be lifted above the first and second posts 22 in the folded position while an operator connects the elongated beam 12 to the first and second posts 22 using the first mounting bracket 14 and the second mounting bracket 16.

The solar panel assembly 10 comprises a first row of flaps 18, which may be connected together with one or more siderails, and a second row of flaps 20, which may be connected together with one or more siderails. The first row of flaps 18 and the second row of flaps 20 can be folded, for example, vertically, as illustrated in FIG. 1, or unfolded, for example, horizontally, as illustrated in FIG. 2. An example of flap 18 is shown in FIG. 3A, and an example of flap 20 is shown in FIG. 3B.

Referring to FIG. 2, a solar panel including the solar panel assembly 10 shown in FIG. 1 is illustrated. In FIG. 2, the solar panel assembly 10 is in the unfolded position, and is connected to the first and second posts 22. The first and second posts are usually aligned along the North-South direction. The configuration illustrated in FIG. 2 is an example configuration of the solar panel during its use to produce electricity, typically around noon time.

After the first row of flaps 18 and the second row of flaps 20 have been unfolded, the first row of flaps 18 may be coupled to the second row of flaps 20 such that the first row of flaps 18 and the second row of flaps 20 rotate in unison around an axis above the elongated beam 12. As such, the solar panels assembly 10 can be oriented to track the daily movement of the sun. However, the orientation may be locked and the solar panels assembly 10 can remain fixed.

While the first and second posts 22 are illustrated as having similar lengths, one of the first and second posts 22 may be shorter than the other such that the solar panel assembly 10 may be tilted for accounting for the average declination of the sun path.

Referring to FIGS. 3A and 4, a flap 18 is illustrated. The flap 18 includes a first frame 34 (shown in FIG. 4) holding a first panel 32 of photovoltaic cells. The first panel 32 may be bifacial and monofacial. The flap 18 includes drive links 26 and 30. Each of the drive links 26 and 30 has a first end configured to be rotatably coupled to the elongated beam 12 (via a shaft portion, not shown in FIG. 3A) and a second end coupled to the first frame 34.

In the example embodiment illustrated in FIG. 3A, the drive links 26 and 30 are implemented using a first pair of drive plates. One of the first pair of drive plates extends laterally along a plane substantially perpendicular to the first panel 32. The other of the first pair of drive links 30 extends laterally along another, offset plane that is also substantially perpendicular to the first panel 32. Each of the drive plates is disposed beyond a periphery of the first frame 34. The drive plates are coupled on opposite sides of the first frame 34. Each of the first pair of drive plates has a lateral size that is larger than a thickness of the first frame 34. This plate configuration for the drive links 26 and 30 may provide sufficient strength to resist gravity and/or wind forces while reducing the total weight and cost of the links.

Referring to FIG. 3B, a flap 20 is illustrated. The flap 20 is substantially a mirror image of the flap 18 shown in FIGS. 3A and 4. The flap 20 includes a second frame (similar to the frame 34 shown in FIG. 4) holding a second panel of photovoltaic cells. Like the first panel 32, the second panel may be bifacial and monofacial. The flap 20 includes drive links 24 and 28. Each of the drive links 24 and 28 have a first end rotatably configured to be coupled to the elongated beam 12 (via a shaft portion, not shown in FIG. 3B) and a second end coupled to the second frame.

Referring to FIGS. 5A and 5B, in use, holes 50 are configured to be traversed by a shaft portion, and the first drive link 26 and 30 are initially capable of rotating relative to the second drive link 24 (or 28) around a central axis of the shaft portion such that the first panel 32 and the second panel can be folded and unfolded. However, the first drive link 26 (or 30) and the second drive link 24 (or 28) are shaped to be coupled to each other when unfolded, and locked such that the first panel 32 and the second panel may rotate in unison around an axis above the elongated beam 12.

For example, the first drive link 26 (or 30) includes a first surface 42 located inside a first aperture. The first surface 42 is offset from the hole 50, which is configured to receive a shaft portion 44 (shown in FIG. 6), in a direction away from the second end of the first drive link 26 (or 30), to which the first frame 34 would be coupled. The second drive link 24 (or 28) includes a second surface 40 located inside a second aperture. The second surface 40 is offset from a hole 50, which is configured to receive the shaft portion 44, in a direction toward the second end of the second drive link 24 (or 28), to which the second frame would be coupled. The first surface 42 and the second surface 40 can be disposed proximate one another (e.g., aligned) with such that a first fastener 52 (shown in FIG. 7 or 8) can be engaged with the first surface 42 and the second surface 40.

Optionally, the first drive link 26 (or 30) includes a third surface 38 located inside a third aperture. The third surface 38 is offset from the hole 50 in a direction toward the second end of the first drive link 26 (or 30). The second drive link 24 (or 28) includes a fourth surface 36 located inside a fourth aperture. The fourth surface 36 is offset from the hole 50 in a direction away from the second end of the second drive link 24 (or 28). If present, the third surface 38 and the fourth surface 36 can be disposed proximate one another (e.g., aligned) when the first surface 42 and the second surface 40 are disposed proximate one another such that a second fastener 52 (shown in FIG. 7 or 8) can be engaged with the third surface 38 and the fourth surface 36. Additional surfaces located inside other apertures may be provided on the first drive link 26 (or 30), and on the second drive link 24 (or 28), so that additional fasteners can be engaged when the additional surfaces are disposed proximate one another (e.g., aligned).

Figure 6:
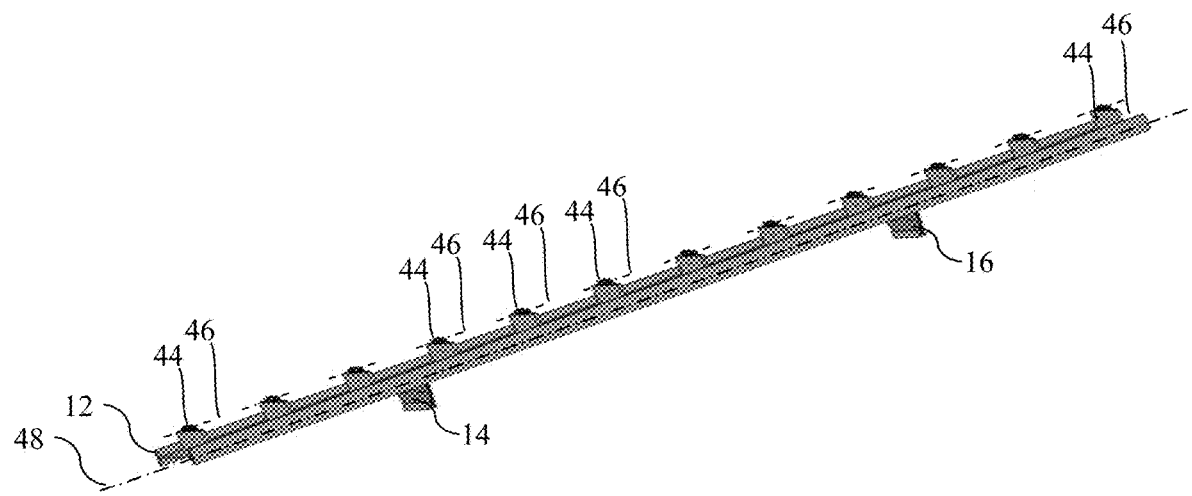
FIG. 6 is a perspective view of an elongated beam, at least two shaft portions, each of the shaft portions being coupled to the elongated beam and being configured to be coupled to drive plates.

Referring to FIG. 6, the elongated beam 12 is shown as an I-beam, i.e., a beam having a cross-section shaped like an "I." However, the elongated beam 12 may have a cross-section having any suitable shape. For example, the cross-section of the elongated beam 12 may be rectangular, or round so that the elongated beam 12 may be at least partially formed by a tube. In particular, in cases where the solar panel assembly 10 is required to resist torsion that may be caused by strong winds, a rectangular cross-section may be preferred.

At least two shaft portions 44 are coupled to the elongated beam 12. Each of the at least two shaft portions 44 has a central axis 46 parallel to the longitudinal axis 48 of the elongated beam 12. Each of the at least two shaft portions can traverse the holes 50 in the first drive link 26 (or 30) and the second drive link 24 (or 28). Accordingly, the first drive link 26 (or 30) is capable of rotating around the central axis of the shaft portion 44 relative to the second drive link 24 (or 28) such that the first panel and the second panel can be folded and unfolded when the first drive link 26 (or 30) and the second drive link 24 (or 28) are not yet coupled with the first and second fasteners 52. As shown, each of the shaft portions 44 may form a shaft by itself, separated from the other shaft portions 44. Alternatively, all of the shaft portions 44 may be part of a single shaft spanning substantially the entire length of the elongated beam 12. Also, a subset of the shaft portions 44 may be part of a single shaft spanning only a fraction of the entire length of the elongated beam 12.

After the first drive link 26 (or 30) and the second drive link 24 (or 28) are coupled with the first and second fasteners 52, the first drive link 26 (or 30) and the second drive link 24 (or 28) can optionally rotate in unison around the central axes of the shaft portions 44.

Figure 7:
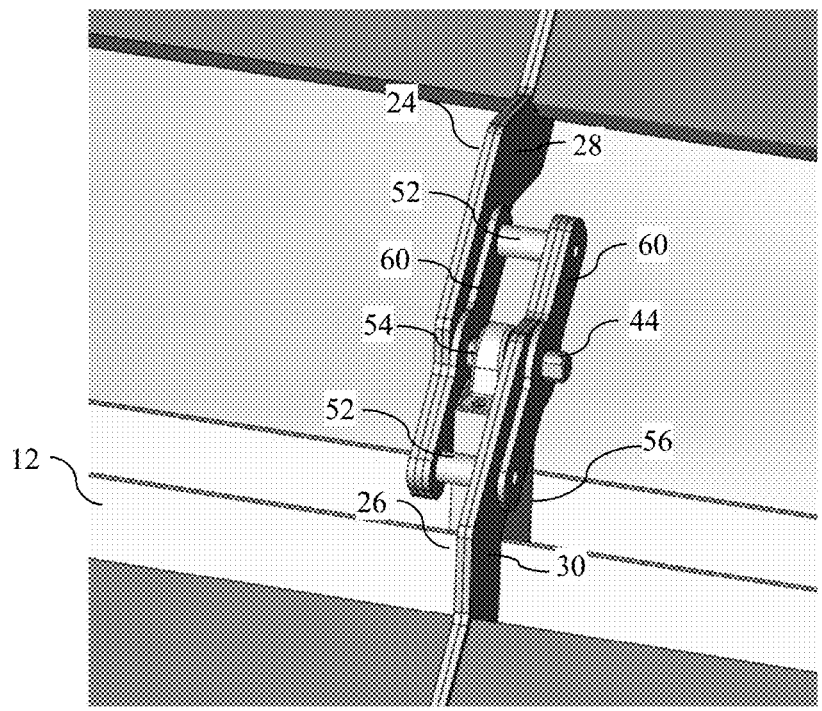
FIG. 7 is a perspective view of an example coupling of a shaft to drive plates.

Referring to FIG. 7, a first example of a coupling of the first drive link 26 (or 30) to the second drive link 24 (or 28) and to the shaft portion 44 is illustrated. In this example, the shaft portion 44 is coupled the elongated beam 12 with a single bearing housing 54 that is positioned above the elongated beam 12 using a spacer 56. The bearing provides that the shaft portion 44 is coupled to the elongated beam 12 by a revolute joint. Mounted on one side of the bearing housing are the first drive links 26 and 30, each coupled to one of two consecutive first frames 34, as well as an optional transfer key 60. Mounted on the other side of the bearing housing are the second drive links 24 and 28, each coupled to one of two consecutive second frames 34, as well as another optional transfer key 60.

As shown in FIG. 7, the first drive link 26 (or 30) and the second drive link 24 (or 28) are coupled to each other with the first and second fasteners 52, and locked such that the first panel 32 and the second panel may rotate in unison around an axis above the elongated beam 12. The transfer keys 60 is also coupled to the first drive link 26 (or 30) and to the second drive link 24 (or 28).

In the example coupling of FIG. 7, the first and second fasteners 52 include optional spacers through which dowel pins (not shown) can be inserted and/or secured with bolts and nuts to clamp the spacers at least between the first drive link 26 (or 30) and the second drive link 24 (or 28); however, other types of fasteners capable of engaging surfaces inside the apertures in the first drive link 26 (or 30), the second drive link 24 (or 28), and optionally the transfer keys 60 may be used.

Figure 8:
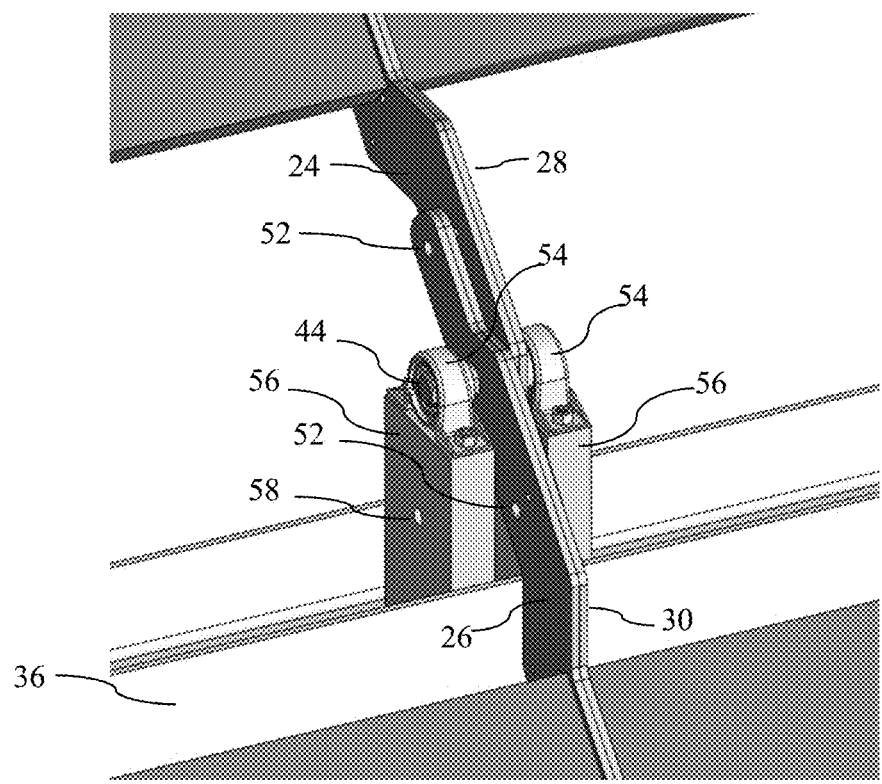
FIG. 8 is a perspective view of another example coupling of a shaft to drive plates.

Referring to FIG. 8, a second example of a coupling of the first drive link 26 (or 30) to the second drive link 24 (or 28) and to the shaft portion 44 is illustrated. In this example, the shaft portion 44 is coupled the elongated beam 12 with a pair bearing housings 54 that are positioned above the elongated beam 12 using a pair of spacers 56. The bearings provide that the shaft portion 44 is coupled to the elongated beam 12 by a revolute joint. Mounted between the pair of spacers 56 are the first drive links 26 and 30, each coupled to one of two consecutive first frames 34, and the second drive links 24 and 28, each coupled to one of two consecutive second frames 34. While omitted in FIG. 8, one or more transfer keys 60 may also be mounted between the pair of spacers 56.

As shown in FIG. 8, the first drive link 26 (or 30) and the second drive link 24 (or 28) are coupled to each other with the first and second fasteners 52, and locked such that the first panel 32 and the second panel may rotate in unison around an axis above the elongated beam 12. While omitted in FIG. 8, one or more transfer keys 60 may also be coupled to the first drive link 26 (or 30) and to the second drive link 24 (or 28).

In the example coupling of FIG. 8, the first and second fastener 52 may not include spacers, and may include dowel pins and bolts; however, other types of fasteners capable of engaging surfaces inside the apertures in the first drive link 26 (or 30), the second drive link 24 (or 28), may be used.

Figure 9:
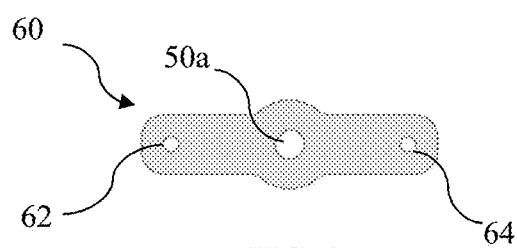
FIG. 9 is a side view of a transfer key.

Referring to FIG. 9, a transfer key 60 is illustrated. As shown, the transfer key 60 may be formed by a transfer plate that extends laterally along a plane. A hole 50a of the transfer key 60 is configured to be traversed by the shaft portion 44 (not shown in FIG. 9) so that the transfer key 60 is coupled to the shaft portion 44. The transfer key includes a fifth surface 62 and a sixth surface 64 inside a fifth aperture and a sixth aperture, respectively, wherein the first surface 42 and the fifth surface 62 can be disposed proximate one another (e.g., aligned), and wherein the third surface 38 and the sixth surface 64 can be disposed proximate one another (e.g., aligned) when the first surface 42 and the fifth surface 62 are disposed proximate one another. Accordingly, the first and second fastener 52 may also engage the fifth surface 62 and the sixth surface 64.

Optionally, the transfer key 60 is coupled to the shaft portion 44 by a prismatic joint. For example, the hole 50a may be D-shaped, and the shaft portion 44 may have a cross-section that is also D-shaped. However, other mechanisms can be used to provide a prismatic joint.

In use, the solar panel assembly 10 (in FIG. 1) may be pre-assembled in a factory. In order to deploy the solar panel assembly 10 on a site, the solar panel assembly 10 is first transported to the site. One the site, the first and second posts 22 (in FIG. 2) may be already secured to the ground to form a portion of the connection to a support (e.g., the ground). While the solar panel assembly 10 is lifted above the first and second posts 22, an operator may connect the elongated beam 12 of the solar panel assembly 10 to the first and second posts 22. Then, the operator may rotate the first drive link 26 (or 30) around the central axis 46 of the shaft portion 44 relative to the second drive link 24 (or 28) such that the first row of flaps 18 and the second row of flaps 20 become unfolded. Once unfolded, an operator may couple the first row of flaps 18 and the second row of flaps 20 to each other such that the first row of flaps 18 and the second row of flaps 20 rotate in unison around the central axis 46 of the shaft portion 44, as shown in FIG. 7 or 8. In the unfolded position, the center of mass of the first row of flaps 18 and the second row of flaps 20 is preferably near the central axes of the shaft portions 44, such as slightly below the central axis of the shaft portions 44. For example, the operator may dispose the first surface 42 of the first drive link 26 (or 30) and the second surface 40 of the second drive link 24 (or 28) (in FIGS. 5A and 5B) proximate one another and engage the first fastener 52 with the first surface 42 and the second surface 40 such that the first drive link 26 (or 30) and the second drive link 24 (or 28) are coupled to each other. Preferably, disposing the first surface 42 and the second surface 40 proximate one another causes the third surface 38 of the first drive link 26 (or 30) and the fourth surface 36 of the second drive link 24 (or 28) to be disposed proximate one another, so that the operator may engage the second fastener 52 with the third surface 38 and the fourth surface 36. If present, the operator may also dispose the first surface 42 and the fifth surface 62 of the transfer key 60 proximate one another. Disposing the first surface 42 and the fifth surface 62 proximate one another causes the third surface 38 and the sixth surface 64 of the transfer key 60 to be disposed proximate one another. The operator may engage the first fastener 52 with the first surface 42, the second surface 40 and the fifth surface 62. The operator may also engage the second fastener 52 with the third surface 38, the fourth surface 36, and the sixth surface 64.

Figure 10:
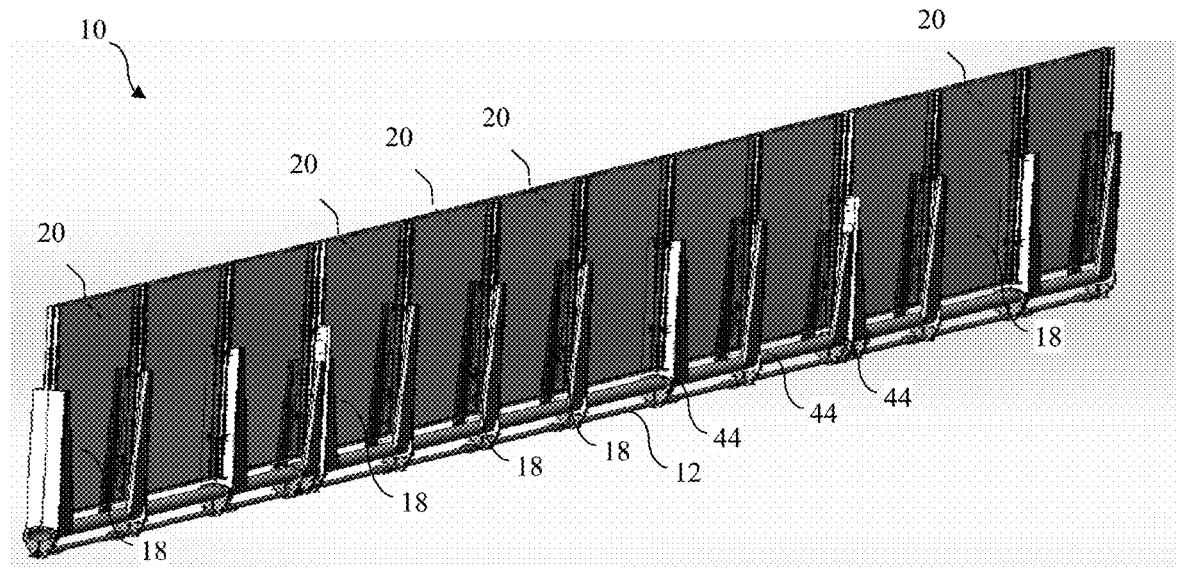
FIG. 10 is a perspective view of another foldable panel assembly illustrated in the folded position.
Figure 11:
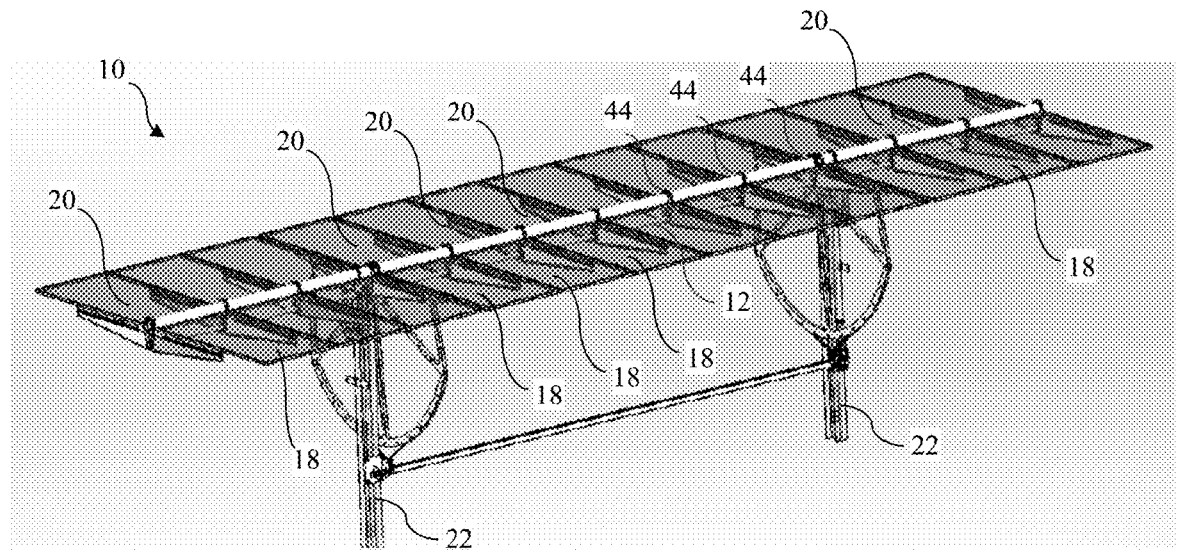
FIG. 11 is a perspective view of a solar panel including the foldable panel assembly shown in FIG. 10, the foldable panel assembly being unfolded and connected to a support.

Referring to FIGS. 10 and 11, another embodiment of a solar panel assembly 10 is shown, with the panels of photovoltaic cells illustrated as being transparent. The embodiment of the solar panel assembly 10 shown in FIGS. 10 and 11 shares several features with the embodiment of the solar panel assembly 10 shown in FIGS. 1 and 2. For example, the solar panel assembly 10 comprises a first row of flaps 18, which may be connected together with one or more siderails, and a second row of flaps 20, which may also be connected together with one or more siderails. The first row of flaps 18 and the second row of flaps 20 can be folded, for example, vertically, as illustrated in FIG. 10, or unfolded, for example, horizontally, as illustrated in FIG. 11. The flaps 20 are substantially mirror images of the flaps 18.

However, while in the embodiment shown in FIGS. 1 and 2, each of the shaft portions 44 may form a shaft by itself, separated from the other shaft portions 44, in the embodiment of FIGS. 10 and 11, all of the shaft portions 44 are part of a single shaft spanning substantially the entire length of the elongated beam 12. Moreover, while in the embodiment shown in FIGS. 1 and 2, the elongated beam 12 is shown as an I-beam, i.e., a beam having a cross-section shaped like an "I," in the embodiment of FIGS. 10 and 11, the elongated beam 12 has a round cross-section, so that the elongated beam 12 may be formed by a tube or a rod. Furthermore, unlike in the embodiment shown in FIGS. 1 and 2, the mounting brackets for connecting the elongated beam 12 to the posts 22 (in FIG. 11) are not pre-assembled to the solar panel assembly 10 in the embodiment of FIGS. 10 and 11. Instead, the mounting brackets and rotating bearings can be first coupled to the posts 22, and then the solar panel assembly 10 can be coupled to the mounting brackets and rotating bearings, as is further explained in the description of FIG. 16. As such, the elongated beam 12 is rotatable relative to the first and second posts 22.

Note that, in other embodiments, the elongated beam 12 may have a cross-section having any suitable shape, and the cross-section may not be round. Moreover, in other embodiments, all of the shaft portions 44 may be part of a plurality of shafts spanning only a fraction of the entire length of the elongated beam 12. Furthermore, in other embodiments, the mounting brackets and rotating bearings for connecting the elongated beam 12 to the posts 22 can be pre-assembled to the solar panel assembly 10.

Figure 12A:
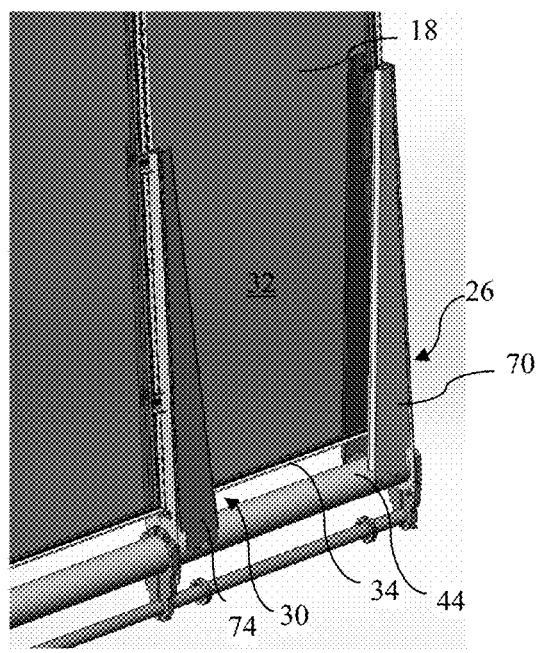
FIGS. 12A and 12B are perspective views of a drive link comprising a drive plate coupled via a revolute joint such that the drive plate can be unfolded.
Figure 12B:
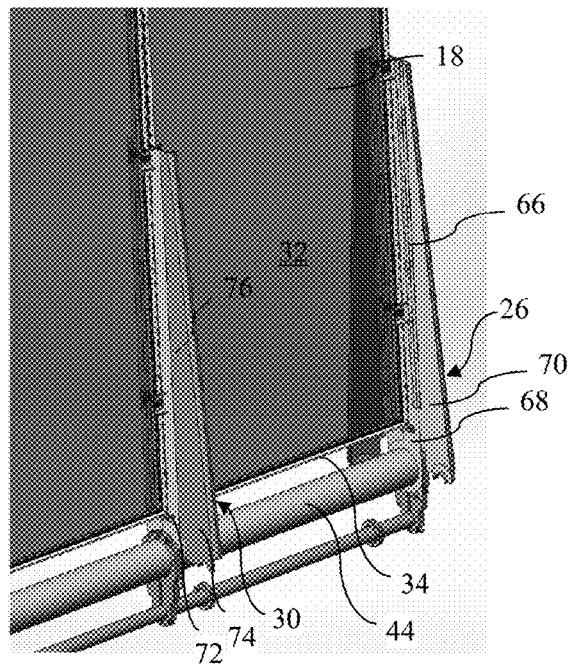

Referring to FIGS. 12A and 12B, a first drive link 26 comprises a first drive plate 68. The first drive plate 68 extends laterally along a plane substantially perpendicular to the central axis of the shaft portion 44. The first drive plate 68 is disposed beyond a periphery of the frame 34, and the first drive plate 68 has a lateral size that is larger than a thickness of the frame 34.

Similar to the first drive link 26, the second drive link 30 comprises a second drive plate 72. The second drive plate 72 extends laterally along a second plane that is offset from the first plane and substantially perpendicular to the central axis of the shaft portion 44. The second drive plate 72 is disposed beyond a periphery of the frame 34, and the second drive plate 72 has a lateral size that is larger than a thickness of the second frame.

The first drive link 26 further comprises a third drive plate 70. The third drive plate 70 is coupled to the first drive plate 68 via a first revolute joint 66. As shown in FIG. 12A, the third drive plate 70 is in a folded position, substantially parallel to the frame 34 and the panel 32 of photovoltaic cells. Such a folded position may be convenient during the transportation of the solar panel assembly 10 from a factory, where the solar panel assembly 10 may have been pre-assembled, to a deployment site. As shown in FIG. 12B, the third drive plate 70 can be unfolded along a plane substantially perpendicular to the central axis of the shaft portion 44. In such an unfolded position, the third drive plate 70 may provide sufficient strength to resist gravity and/or wind forces.

Similarly, the second drive link 30 further comprises a fourth drive plate 74. The fourth drive plate 74 is coupled to the second drive plate 72 via a second revolute joint 76 such that the fourth drive plate 74 can be unfolded along the second plane substantially perpendicular to the central axis of the shaft portion 44. In the example shown, the third drive plate 70 and the fourth drive plate 74 fold by rotating toward a middle of a flap 18 to avoid interference with drive plates of other flaps 18 in the same row. However, a flap 20 can simply be implemented as a mirror image of the flap 18.

For the sake of simplicity, only a portion of a flap 18 is described with respect to FIGS. 12A and 12B. However, a person having ordinary skill, given the benefit of this disclosure, can make and use the flaps 20 as substantially mirror images of the flap 18.

Figure 13:
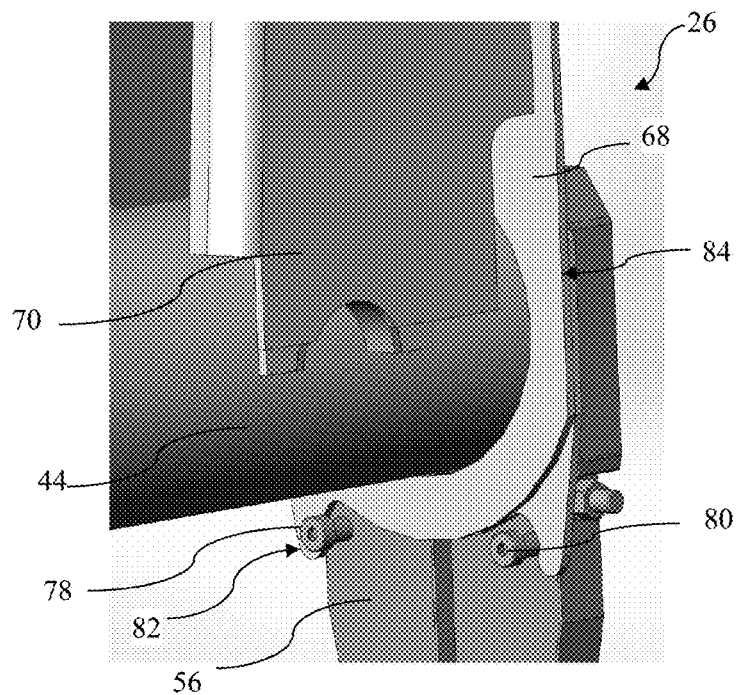
FIG. 13 is a perspective view of a portion of the foldable panel assembly shown in FIG. 12A illustrating the folded position of the drive plate.

FIG. 13 is a perspective view of a portion of the foldable panel assembly shown in FIG. 12A, illustrating the folded position of the drive plate 70. Similar to the embodiment of the solar panel assembly 10 shown in FIGS. 1 and 2, the shaft portion 44 is positioned above the elongated beam 12 (not shown) using a plurality of spacers 56 (only one shown) distributed along the length of the elongated beam 12. However, unlike the embodiment of the solar panel assembly 10 shown in FIGS. 1 and 2, the shaft portion 44 is rotatably coupled to the elongated beam 12 with rotating bearings.

Optionally, the rotation of the first drive link 26, and of other drive links, relative to the shaft portion 44 may be limited to a 90-degree angular sector via pins 78 and 80, which are positioned to engage stop surfaces 82 and 84, respectively, when the flap 18 moves past the vertical position, or past the horizontal position, respectively. Pins similar to the pins 78 and 80 may be secured to each spacer 56. Such a rotation limit may be useful during the transportation and assembly of the solar panel assembly 10.

Figure 14:
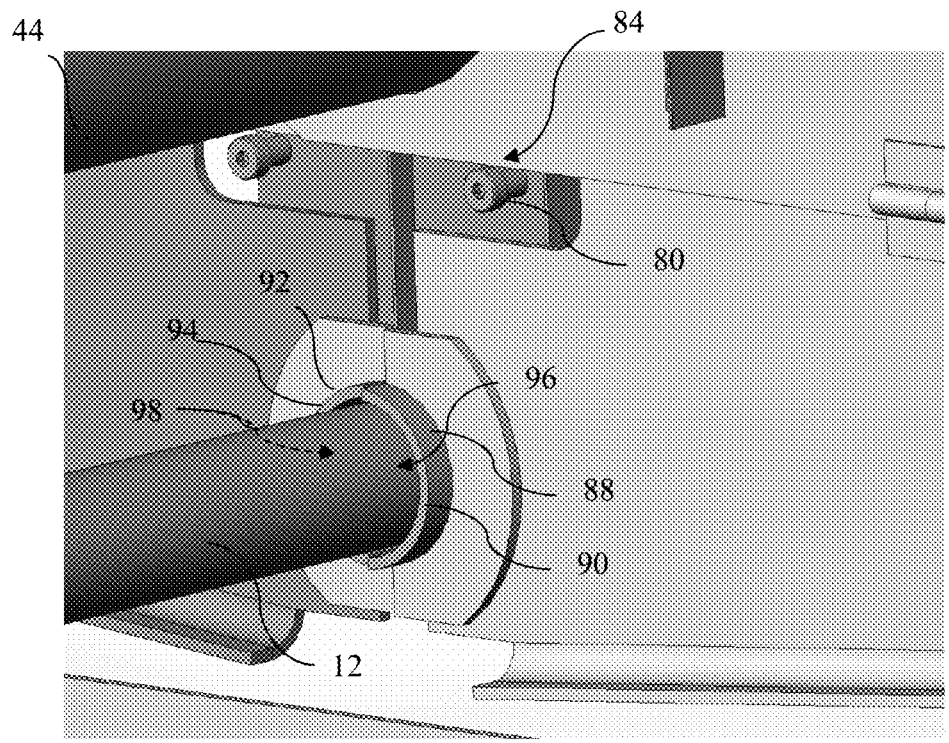
FIG. 14 is a perspective view of a portion of the foldable panel assembly shown in FIG. 10 illustrated before the engagement of a fastener.
Figure 15:
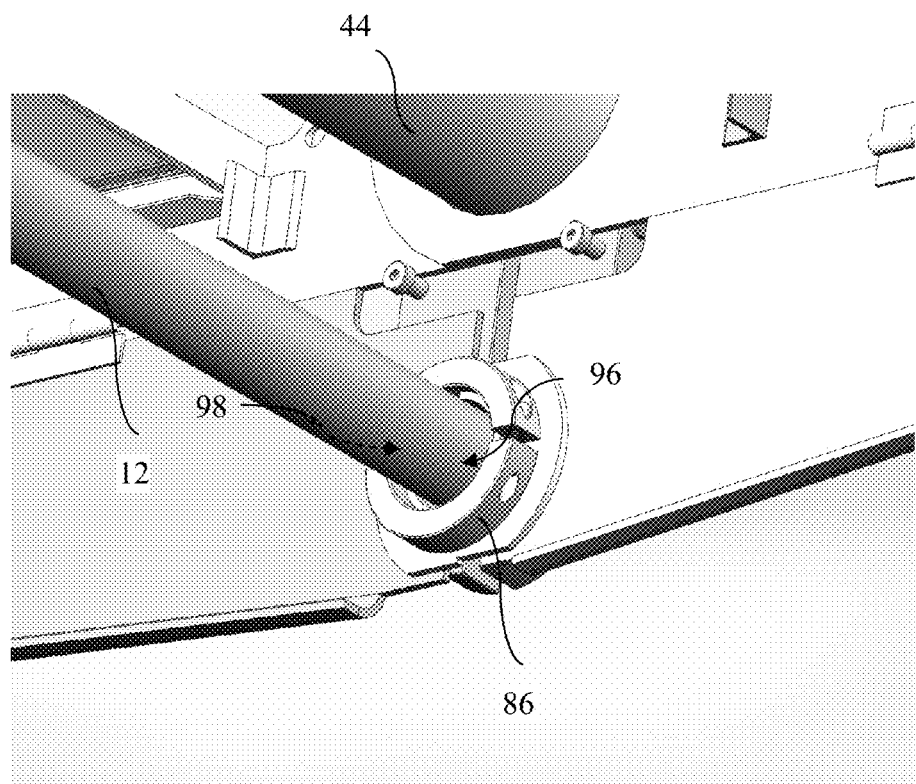
FIG. 15 is a perspective view of the portion of the foldable panel assembly shown in FIG. 14 illustrated after the engagement of the fastener.

Referring to FIGS. 14 and 15, the unfolded position of the first drive link 26 is illustrated before the engagement of a fastener 86 and after the after engagement of the fastener 86. The fastener 86 comprises a collar clamp, which may be C-shaped. The fastener engages a first surface 88 that is located on a first flange 90 of the first drive link 26. The fastener engages a second surface 92 on a second flange 94 of a drive link coupled to a flap 20 that mirrors the flap 18 in which the first drive link 26 is included. The first surface 88 and the second 92 may be cylindrical so as to correspond to the shape of the inner surface of the fastener 86. In other embodiments, the fastener 86, the first surface 88, and the second surface 92 may have other suitable shapes that correspond to one another.

Furthermore, the first drive link 26 includes a first hollow 96 that is offset from the shaft portion 44 in a direction substantially perpendicular to the first frame 34 when the drive plate 70 is unfolded. Similarly, the drive link coupled to a mirror flap 20 and corresponding to the first drive link 26 includes a second hollow 98 that is also moved to a position that is offset from the shaft portion 44 in a direction substantially perpendicular to the frame of the mirror flap 20. In the unfolded positions of the drive links illustrated in FIGS. 14 and 15, the first hollow 96 the second hollow 98 can be disposed proximate one another (e.g., aligned) such that a hole is formed by the first hollow 96 and the second hollow 98 and the elongated beam 12 can pass through the hole.

Figure 16:
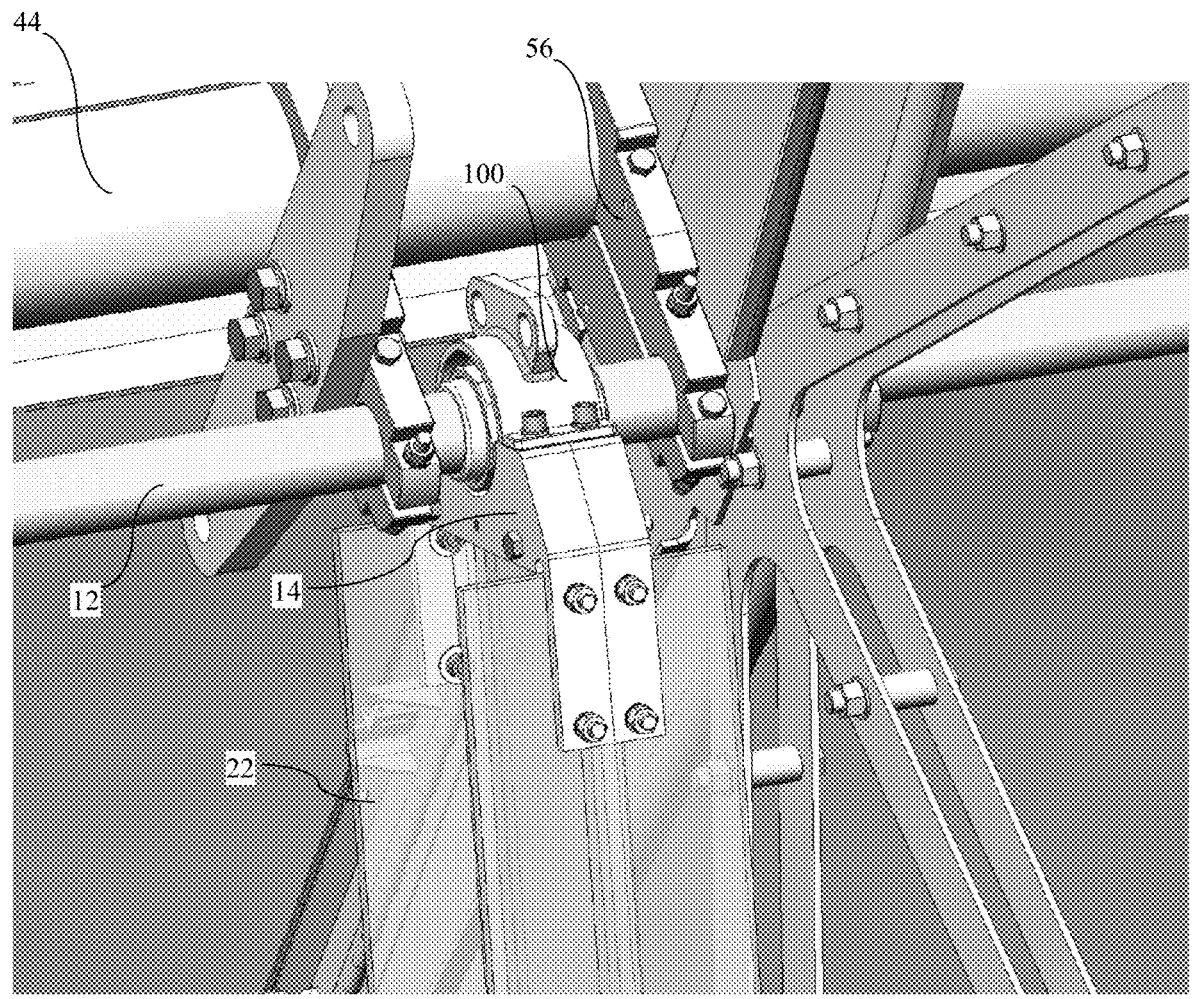
FIG. 16 is a perspective view of a mounting bracket and a rotating bearing used to couple the foldable panel assembly shown in FIG. 10 to a post.

Referring to FIG. 16, a first mounting bracket 14 couples the panel assembly 10 shown in FIG. 10 to a first post 22. A first rotating bearing 100 connects the first mounting bracket 14 to the elongated beam 12. Similarly, a second mounting bracket also couples the panel assembly 10 shown in FIG. 10 to a second post, and a second rotating bearing connects the second mounting bracket to the elongated beam 12. As such, the elongated beam 12 is rotatable relative to the first post 22 and the second post, as well as relative to the support (e.g., the ground) into which the first post 22 and the second post are secured. In use, the solar panel assembly 10, once unfolded, can be orientable to track the daily movement of the sun. In other embodiments, the first rotating bearing 100 and the second rotating bearing can be omitted, and solar panel assembly can be fixed.

In use, the solar panel assembly 10 shown in FIGS. 10 and 11 can be transported to a site in the folded position shown in FIG. 10, and then unfolded as shown in FIG. 11. For example, an operator can couple the solar panel assembly 10 to posts previously secured into a support at the deployment site, as shown in FIG. 16, while the solar panel assembly 10 is still in the folded position. Then, rotatable drive plates such as the drive plates 70 and 74 can be unfolded as shown in the sequence of FIGS. 12A and 12B. Consequently, the first row of flaps 18 and the second row of flaps 20 can be unfolded by rotating drive links such as the drive links 26 and 30 around the central axis of the shaft portion 44 to reach the position illustrated in FIG. 14. Finally, the drive links from opposing flaps are coupled to one another with the fastener 86, as is shown in FIG. 15. Unlike the embodiment shown in FIGS. 1 and 2, where the first row of flaps 18 and the second row of flaps 20 can rotate in unison around the shaft portion 44, in the embodiment shown in FIGS. 10 and 11, the first row of flaps 18 and the second row of flaps 20 may not rotate around the shaft portion 44 after the first row of flaps 18 and the second row of flaps 20 are unfolded. Instead, the first row of flaps 18 and the second row of flaps 20 can optionally rotate around the elongated beam 12 thanks to rotating bearings such as the rotating bearing 100 shown in FIG. 16.

While the invention is susceptible to various modifications and alternative forms, specific embodiments thereof are shown by way of example in the drawings and description. It should be understood, however, that the drawings and detailed description thereto are not intended to limit the claims to the particular form disclosed, but on the contrary, the intention is to cover all modifications, equivalents, and alternatives falling within the scope of the claims.

What is claimed is:

1. A solar panel assembly for connection to a support, comprising:

an elongated beam, the elongated beam having a longitudinal axis;

a shaft portion, the shaft portion being coupled to the elongated beam, the shaft portion having a central axis parallel to the longitudinal axis of the elongated beam;
a first frame holding a first panel of photovoltaic cells;
a first drive link, the first drive link having a first end rotatably coupled to the shaft portion and a second end coupled to the first frame;
a second frame holding a second panel of photovoltaic cells; and
a second drive link, the second drive link having a first end rotatably coupled to the shaft portion and a second end coupled to the first frame;
wherein the first drive link is capable of rotating around the central axis of the shaft portion relative to the second drive link such that the first panel and the second panel can be folded and unfolded,
wherein the first drive link and the second drive link are shaped to be coupled to each other when unfolded such that the first panel and the second panel do not rotate relative to each other,
wherein the first drive link includes a first surface offset from the shaft portion,
wherein the second drive link includes a second surface offset from the shaft portion, and
wherein the first surface and the second surface can be disposed proximate one another such that a first fastener can be engaged with the first surface and the second surface.

2. The solar panel assembly of claim 1,
wherein the first surface is located in a first aperture of the first drive link or on a first flange of the first drive link, and
wherein the second surface is located in a second aperture of the second drive link or on a second flange of the second drive link.

3. The solar panel assembly of claim 2,
wherein the first surface is located on the first flange of the first drive link,
wherein the second surface is located on a second flange of the second drive link, and
wherein the first fastener comprises a collar clamp.

4. The solar panel assembly of claim 2,
wherein the first surface is located in the first aperture of the first drive link,
wherein the second surface is located in the second aperture of the second drive link,
wherein the first drive link further includes a third aperture offset from the shaft portion in a direction toward the second end of the first drive link,
wherein the second drive link further includes a fourth aperture offset from the shaft portion in a direction away from the second end of the second drive link, and
wherein the third aperture and the fourth aperture can be disposed proximate one another when the first aperture and the second aperture are disposed proximate one another such that a second fastener can be engaged with the third aperture and the fourth aperture.

5. The solar panel assembly of claim 4, further comprising a transfer key, the transfer key being coupled to the shaft portion, the transfer key including a fifth aperture and a sixth aperture, wherein the first aperture and the fifth aperture can be disposed proximate one another, and wherein the third aperture and the sixth aperture can be disposed proximate one another when the first aperture and the fifth aperture are disposed proximate one another.

6. The solar panel assembly of claim 1, further comprising a transfer key, the transfer key being coupled to the shaft portion, the transfer key being shaped to be coupled to the first drive link and to the second drive link.

7. The solar panel assembly of claim 6, wherein the transfer key is coupled to the shaft portion by a prismatic joint, and the shaft portion is coupled to the elongated beam by a revolute joint.

8. A solar panel assembly for connection to a support, comprising:
an elongated beam, the elongated beam having a longitudinal axis;
a shaft portion, the shaft portion being coupled to the elongated beam, the shaft portion having a central axis parallel to the longitudinal axis of the elongated beam;
a first frame holding a first panel of photovoltaic cells;
a first drive link, the first drive link having a first end rotatably coupled to the shaft portion and a second end coupled to the first frame;
a second frame holding a second panel of photovoltaic cells; and
a second drive link, the second drive link having a first end rotatably coupled to the shaft portion and a second end coupled to the first frame;
wherein the first drive link is capable of rotating around the central axis of the shaft portion relative to the second drive link such that the first panel and the second panel can be folded and unfolded;
wherein the first drive link and the second drive link are shaped to be coupled to each other when unfolded such that the first panel and the second panel do not rotate relative to each other;
wherein the first drive link comprises a first drive plate, the first drive plate extending laterally along a first plane substantially perpendicular to the central axis of the shaft portion, the first drive plate being disposed beyond a periphery of the first frame, the first drive plate having a lateral size that is larger than a thickness of the first frame;
wherein the second drive link comprises a second drive plate, the second drive plate extending laterally along a second plane substantially perpendicular to the central axis of the shaft portion, the second drive plate being disposed beyond a periphery of the second frame, the second drive plate having a lateral size that is larger than a thickness of the second frame;
and wherein the second plane is offset from the first plane.

9. The solar panel assembly of claim 8,
wherein the first drive link further comprises a third drive plate, the third drive plate being coupled to the first drive plate via a first revolute joint such that the third drive plate can be unfolded along the first plane substantially perpendicular to the central axis of the shaft portion; and
wherein the second drive link further comprises a fourth drive plate, the fourth drive plate being coupled to the second drive plate via a second revolute joint such that the fourth drive plate can be unfolded along the second plane substantially perpendicular to the central axis of the shaft portion.

10. The solar panel assembly of claim 8, further comprising a transfer plate, the transfer plate being coupled to the shaft portion, the transfer plate extending laterally along a third plane substantially perpendicular to the central axis of the shaft portion, the transfer plate being sized to have a first end coupled to the first drive plate and a second end coupled to the second drive plate, wherein the third plane is offset from the first plane and from the second plane.

11. The solar panel assembly of claim 10, wherein the transfer plate is coupled to the shaft portion by a prismatic joint, and the shaft portion is coupled to the elongated beam by a revolute joint.

12. The solar panel assembly of claim 8,
wherein the first drive link includes a first hollow that can be moved to a position that is offset from the shaft portion in a direction substantially perpendicular to the first frame,
wherein the second drive link includes a second hollow that can be moved to a position that is offset from the shaft portion in a direction substantially perpendicular to the second frame, and
wherein the first hollow and the second hollow can be disposed proximate one another such that the elongated beam can pass through a hole formed by the first hollow and the second hollow.

13. A method for deploying a solar panel assembly on a site, comprising:
transporting a solar panel assembly to the site, wherein the solar panel assembly includes:
an elongated beam, the elongated beam having a longitudinal axis;
a shaft portion, the shaft portion being coupled to the elongated beam, the shaft portion having an axis parallel to the longitudinal axis of the elongated beam;
a first frame holding a first panel of photovoltaic cells;
a first drive link, the first drive link having a first end rotatably coupled to the shaft portion and a second end coupled to the first frame;
a second frame holding a second panel of photovoltaic cells; and
a second drive link, the second drive link having a first end rotatably coupled to the shaft portion and a second end coupled to the first frame;
wherein the first panel and the second panel are folded during at least a portion of the transportation,
wherein the first drive link includes a first surface offset from the shaft portion, and
wherein the second drive link includes a second surface offset from the shaft portion,
connecting the elongated beam of the solar panel assembly to a support;
rotating the first drive link around the central axis of the shaft portion relative to the second drive link such that the first panel and the second panel become unfolded,
disposing the first surface and the second surface proximate one another; and
when unfolded, coupling the first drive link and the second drive link to each other such that the first panel and the second panel do not rotate relative to each other by engaging a first fastener with the first surface and the second surface such that the first drive link and the second drive link are coupled to each other.

14. The method of claim 13,
wherein the first surface is located in a first aperture of the first drive link or on a first flange of the first drive link, and
wherein the second surface is located in a second aperture of the second drive link or on a second flange of the second drive link.

15. The method of claim 14,
wherein the first surface is located on the first flange of the first drive link,
wherein the second surface is located on a second flange of the second drive link, and
wherein the first fastener comprises a collar clamp.

16. The method of claim 13,
wherein the first surface is located in the first aperture of the first drive link,
wherein the second surface is located in the second aperture of the second drive link,
wherein the first drive link further includes a third aperture offset from the shaft portion in a direction toward the second end of the first drive link,
wherein the second drive link further includes a fourth aperture offset from the shaft portion in a direction away from the second end of the second drive link, and
wherein disposing the first aperture and the second aperture proximate one another causes the third aperture and the fourth aperture to be disposed proximate one another, the method further comprising:
engaging a second fastener with the third aperture and the fourth aperture.

17. The method of claim 16, wherein the solar panel assembly further includes a transfer key, the transfer key being coupled to the shaft portion, the transfer key including a fifth aperture and a sixth aperture, the method comprising:
disposing the first aperture and the fifth aperture proximate one another, wherein disposing the first aperture and the fifth aperture proximate one another causes the third aperture and the sixth aperture to be disposed proximate one another.

18. The method of claim 13, wherein the solar panel assembly further includes a transfer key, the transfer key being coupled to the shaft portion, the method further comprising:
coupling the transfer key to the first drive link and to the second drive link.

19. A method for deploying a solar panel assembly on a site, comprising:
transporting a solar panel assembly to the site, wherein the solar panel assembly includes:
an elongated beam, the elongated beam having a longitudinal axis;
a shaft portion, the shaft portion being coupled to the elongated beam, the shaft portion having an axis parallel to the longitudinal axis of the elongated beam;
a first frame holding a first panel of photovoltaic cells;
a first drive link, the first drive link having a first end rotatably coupled to the shaft portion and a second end coupled to the first frame;
a second frame holding a second panel of photovoltaic cells; and
a second drive link, the second drive link having a first end rotatably coupled to the shaft portion and a second end coupled to the first frame;
wherein the first panel and the second panel are folded during at least a portion of the transportation;
wherein the first drive link comprises a first drive plate, the first drive plate extending laterally along a first plane substantially perpendicular to the central axis of the shaft portion, the first drive plate being disposed beyond a periphery of the first frame, the first drive plate having a lateral size that is larger than a thickness of the first frame;
wherein the first drive link further comprises a second drive plate, the second drive plate being coupled to the first drive plate via a first revolute joint;
connecting the elongated beam of the solar panel assembly to a support;

rotating the first drive link around the central axis of the shaft portion relative to the second drive link such that the first panel and the second panel become unfolded;

unfolding the second drive plate along the first plane; and when unfolded, coupling the first drive link and the second drive link to each other such that the first panel and the second panel do not rotate relative to each other.

20. The method of claim 19, wherein the first drive link includes a first hollow, wherein the second drive link includes a second hollow, and the method further comprising:

moving the first hollow to a position that is offset from the shaft portion in a direction substantially perpendicular to the first frame;

moving the second hollow to a position that is offset from the shaft portion in a direction substantially perpendicular to the second frame;

disposing the first hollow and the second hollow proximate one another such that the elongated beam passes through a hole formed by the first hollow and the second hollow.

21. A solar panel, comprising:

a solar panel assembly including:

an elongated beam, the elongated beam having a longitudinal axis;

at least two shaft portions, each of the shaft portions being coupled to the elongated beam, each of the shaft portions having a central axis parallel to the longitudinal axis of the elongated beam;

a first frame holding a first panel of photovoltaic cells;

a first pair of drive plates, one of the first pair of drive plates extending laterally along a plane substantially perpendicular to the central axis of one of the at least two shaft portions, the other of the first pair of drive plates extending laterally along a plane substantially perpendicular to the central axis of the other of the at least two shaft portions, each of the first pair of drive plates being disposed beyond a periphery of the first frame, the first pair of drive plates being coupled on opposite sides of the first frame, each of the first pair of drive plates having a lateral size that is larger than a thickness of the first frame;

a second frame holding a panel of photovoltaic cells; and a second pair of drive plates, one of the second pair of drive plates extending laterally along a plane substantially perpendicular to the central axis of one of the at least two shaft portions, the other of the second pair of drive plates extending laterally along a plane substantially perpendicular to the central axis of the other of the at least two shaft portions, each of the second pair of drive plates being disposed beyond a periphery of the second frame, the second pair of drive plates being coupled on opposite sides of the second frame, each of the second pair of drive plates having a lateral size that is larger than a thickness of the second frame;

wherein one of the first pair of drive plates and one of the second pair of drive plates are coupled to each other and the other of the first pair of drive plates and the other of the second pair of drive plates are coupled to each other such that the first panel and the second panel do not rotate relative to each other;

a first post secured into a support;

a first mounting bracket connecting the elongated beam to the first post;

a second post secured into the support; and a second mounting bracket connecting the elongated beam to the second post.

22. The solar panel of claim 21, further comprising:

a first rotating bearing connecting the first mounting bracket to the elongated beam; and a second rotating bearing connecting the second mounting bracket to the elongated beam.

23. The solar panel of claim 21, wherein each of the first pair of drive plates is coupled to another drive plate via a revolute joint such that the other drive plate can be unfolded along a plane substantially perpendicular to the central axis of one of the at least two shaft portions; and wherein each of the second pair of drive plates is coupled to another drive plate via a revolute joint such that the other drive plate can be unfolded along a plane substantially perpendicular to the central axis of one of the at least two shaft portions.

24. The solar panel of claim 21, wherein the at least two shaft portions are part of a single shaft spanning substantially the entire length of the elongated beam.

* * * * *